(12) United States Patent
Smith

(10) Patent No.: US 7,657,018 B2
(45) Date of Patent: *Feb. 2, 2010

(54) METHOD AND SYSTEM FOR COMBINING A CONVERSION BETWEEN TIME-DIVISION MULTIPLEXED DIGITAL SIGNALS AND PACKETIZED DIGITAL SIGNALS WITH A SWITCHING SYSTEM INTERFACE

(76) Inventor: David M. Smith, 929 Westbrook Dr., Plano, TX (US) 75075

( * ) Notice: Subject to any disclaimer, the term of this patent is extended or adjusted under 35 U.S.C. 154(b) by 577 days.

This patent is subject to a terminal disclaimer.

(21) Appl. No.: 11/289,179

(22) Filed: Nov. 29, 2005

(65) Prior Publication Data

US 2006/0088053 A1 Apr. 27, 2006

Related U.S. Application Data

(63) Continuation-in-part of application No. 10/971,821, filed on Oct. 22, 2004, now Pat. No. 7,319,747.

(51) Int. Cl.
*H04M 7/00* (2006.01)

(52) U.S. Cl. .................. 379/224; 379/9.05; 379/14; 379/14.01; 379/15.02; 379/15.03; 379/15.04; 379/112.02; 379/221.04; 379/279; 379/221.03

(58) Field of Classification Search ............ 379/224, 379/9.05, 14, 14.01, 15.02, 15.03, 15.04, 379/112.02, 221.04, 279, 221.03
See application file for complete search history.

(56) References Cited

U.S. PATENT DOCUMENTS

| 5,903,372 | A  | * | 5/1999 | Czerwiec ................ 398/66 |
| 6,064,673 | A  | * | 5/2000 | Anderson et al. ........... 370/389 |
| 6,459,783 | B1 | * | 10/2002 | March et al. ........... 379/211.02 |
| 2002/0128023 | A1 | * | 9/2002 | Forte ................. 455/461 |
| 2004/0081174 | A1 | * | 4/2004 | Lakhani et al. ........ 370/395.61 |

* cited by examiner

*Primary Examiner*—Quynh H Nguyen
(74) *Attorney, Agent, or Firm*—Michael L. Diaz

(57) ABSTRACT

The present invention is a switching system interface providing conversion between time-division multiplexed digital signals and packetized digital signals used to bypass a common control and switch matrix of a class 5 digital switch. The switching system interface includes a network interface for terminating a digital transmission facility that is part of a network architecture. In addition, the interface includes a line/trunk interface, compatible with the internal signals used to operate the line/trunk interface of the class 5 digital switching system and a switch, connected to the network interface and to the line/trunk interface, for routing data between network interfaces and line/trunk interface. The interface also converts the data between time-division multiplexed digital signals and packetized digital signals.

16 Claims, 6 Drawing Sheets

METHOD AND SYSTEM FOR COMBINING A CONVERSION BETWEEN TIME-DIVISION MULTIPLEXED DIGITAL SIGNALS AND PACKETIZED DIGITAL SIGNALS WITH A SWITCHING SYSTEM INTERFACE

RELATED APPLICATIONS

This application is a continuation-in-part of U.S. patent application Ser. No. 10/971,821 by David M. Smith entitled "METHOD AND SYSTEM FOR COMBINING AN EMERGENCY STANDALONE SWITCHING DEVICE WITH A SWITCHING SYSTEM INTERFACE," filed Oct. 22, 2004 now U.S. Pat. No. 7,319,747 which claims the priority of U.S. Pat. No. 6,807,273 by David M. Smith entitled "METHOD AND APPARATUS FOR BYPASSING THE COMMON CONTROL AND SWITCH MATRIX OF A DIGITAL SWITCHING SYSTEM FOR TELECOMMUNICATIONS NETWORKS," filed Nov. 30, 2001 and are hereby both incorporated in their entirety by reference herein.

BACKGROUND OF THE INVENTION

1. Field of the Invention

This invention relates to telecommunications. Specifically, the present invention relates to a system and method of providing a conversion between time-division multiplexed digital signals and packetized digital signals with a switching system interface utilized to bypass a common control and switch matrix of a digital switch.

2. Description of the Related Art

A class 5 central office comprises a building or room which houses a class 5 switching system, which operates to connect telephones and other devices used by end-user customers ("subscribers") to a telecommunications network such as the public switched telephone network ("PSTN"). A class 5 digital switch also converts the analog signals used by telephones, modems, FAX machines, and some PBX trunks, into the digital signals that are routed through a digital telecommunications network. The class 5 digital switch also provides special services for caller ID displays and message waiting lights for subscribers, and it processes and routes calls from digital PBX trunks, ISDN lines, and digital loop carriers ("DLC") to a telecommunications network.

U.S. Pat. No. 6,807,273 ("'273") discloses a novel method and system for bypassing a common control and switch matrix of a class 5 digital switch by a switching system interface that couples one or more line/trunk frames of the digital switch to one or more transmission facilities in a communications network that preferably operates under an industry-recognized protocol.

A common control and switch matrix of a first class 5 digital switch may be bypassed by a switching system interface that couples one or more line/trunk frames of the digital switch to one or more industry standard digital transmission facilities that make up the remote end of an industry standard DLC architecture. This configuration provides the benefit that the line/trunk frames associated with the first digital switch may be operated by a second class 5 digital switch or media gateway of any manufacture, so that the legacy software of the first digital switch may be discarded and/or any limitations of the legacy switch matrix may be overcome, while retaining the installed legacy line/trunk frames and cable plant and incurring minimal changes to the installed physical plant.

There is a trend to employ networks that carry both voice calls and data over common transport based on connectionless access protocols such as asynchronous transfer mode ("ATM") and transport control protocol/internet protocol ("TCP/IP"). These networks are also referred to as "packet networks". Packet networks simplify the problem of carrying both voice and data from region to region. Routing calls over such a network permits the use of common routing hardware controlled by so-called "soft switches", which essentially are computers running call processing software.

"Media gateways" are specialized packet switches that also convert the time-division multiplexed digital format of voice calls on trunks from legacy class 5 switches into the packetized formats used in packet networks. Present methods require the use of a media gateway in order to route calls from legacy time-division multiplexed equipment through a packet network.

Virtually all media gateways support GR303 as a protocol for interfacing to time-division multiplexed equipment. Therefore, a switching system interface for bypassing the common control and switch matrix of a class 5 digital switch, by coupling the line/trunk frames of the digital switch to digital transmission facilities that make up the remote end of an industry standard DLC architecture, can be used with a media gateway to route calls between the line/trunk frames and a packet network. However, the cost and complexity are increased by virtue of the fact that two types of network equipment must be purchased, installed, and administered. The complexity of this configuration may be further increased if the softswitch that processes calls for the packet network controls both the media gateway and switching system interface.

Therefore, what is needed is a system and method to provide the conversion between time-division multiplexed digital signals and packetized digital signals within the switching system interface in order to eliminate separate and different types of costly equipment, such as media gateways.

If a network operator chooses to bypass the common control and switch matrix of several class 5 digital switches, one or more of the line/trunk frames of each of the digital switches may be placed under the control of another digital switch that provides call processing for a larger geographical region, in order to reduce the number of switches in the network. The telecommunications industry often refers to this as "network flattening" or "network collapsing," and it can provide many advantages to the network operator, such as lower equipment costs, lower operating and maintenance costs, more efficient use of complex switching software and routing databases, simpler network management, etc.

U.S. application Ser. No. 10/971,821 discloses the use of an emergency standalone switching device. The switching system interface may then be equipped with the emergency standalone switching device, so that the combination can be used with the regional full-featured switching system while maintaining the capability to make local and 911 calls in a serving area that is temporarily isolated from the regional system due to equipment failure, facility damage, or other reasons. This combination also has the advantage that the switching system interface can be used to aggregate subscribers in the serving area that are served through DLCs, as well as those served through legacy line/trunk frames. This allows all subscribers served by time-division multiplexed equipment to be protected by the emergency standalone switching device in the switching system interface, and for call processing to take place through one call control interface to the switching system interface. This simplifies the network topology and simplifies the task of administering the databases necessary for the emergency standalone switching device.

It would also be advantageous to aggregate subscribers who use packet-based telephones, such as IP phones that are now being used by some businesses, or who use telephones connected to packet-based access networks, such as new-generation telephone service over cable systems. This would allow all subscribers in a serving area to be protected by the emergency standalone switching device in the switching system interface, and for all call processing to take place through one call control interface to the switching system interface. This configuration provides the benefit of simplifying the network topology to the point where all forms of telephony would integrate seamlessly into one network.

Therefore, a system and method is needed to implement the conversion between time-division multiplexed digital signals and packetized digital signals within the switching system interface, along with the emergency standalone switching device, in such a way that all subscribers in a serving area can be served by the same call processing interface and the same regional full-featured switching system, and be protected by a common emergency standalone switching device with a common database. In addition, the entire combination should be able to route and process calls between subscribers within a serving area without the need for external switching equipment, such as a softswitch.

Thus, it would be a distinct advantage to provide a system and method to combine a conversion between time-division multiplexed digital signals and packetized digital signals with a switching system interface used to bypass the common control and switch matrix of a class 5 digital switch, and also with a switching system interface that includes an emergency standalone switching device. It is an object of the present invention to provide such a system and method.

SUMMARY OF THE INVENTION

It is a primary object of this invention to combine a conversion between time-division multiplexed digital signals and packetized digital signals with a switching system interface used to bypass the common control and switch matrix of a legacy class 5 digital switch, so that the combination can be used to convert and route calls between time-division multiplexed equipment, such as legacy line/trunk frames, DLCs, and a packet network.

It is a further object of this invention to combine an emergency standalone switching device that can route calls between subscribers in a serving area without the use of external switching equipment, and regardless of whether the subscribers are served by time-division multiplexed equipment or by any form of pack-based equipment or access network.

In accordance with the present invention, a conversion between time-division multiplexed digital signals and packetized digital signals with a switching system interface used to bypass the common control and switch matrix of a legacy class 5 digital switch is provided such that calls may be routed between time-division multiplexed equipment and a packet network, and that an emergency standalone switching device may route calls between subscribers within a serving area without the use of external switching equipment.

In one aspect, the present invention is a switching system converter providing conversion between time-division multiplexed digital signals and packetized digital signals used to bypass a common control and switch matrix of a class 5 digital switch. The switching system converter includes at least one network interface for terminating a digital transmission facility that is part of a packet-network architecture. In addition, the interface includes at least one line/trunk interface, compatible with the internal signals used to operate the line/trunk frame of the class 5 digital switching system and a switching means, connected to the network interface and to the line/trunk interface, for routing data between network interfaces and line/trunk interface. The interface may also convert the data between time-division multiplexed digital signals and packetized digital signals.

In another aspect, the present invention is a method of combining packetized digital signals and time-division multiplexed digital signals with a switching system interface used to bypass the common control and switch matrix of a legacy class 5 digital switch. The method begins by accessing a first connection providing internal signals used to control line and trunk interfaces of the first digital switching system and convey data in and out of the line and trunk interfaces. Next, a switching system interface, which is compatible with the first connection providing internal signals, is applied to the first connection. The switching system interface bypasses at least a portion of the common control and switch matrix. The interface is compatible with a digital transmission facility within the telecommunications network. The signals are then converted between packetized digital signals and time-division multiplexed digital signals through the switching system interface as required.

In still another aspect, the present invention is an emergency switching system with a switching system interface providing conversion between time-division multiplexed digital signals and packetized digital signals used to bypass a common control and switch matrix of a class 5 digital switch. The emergency switching system includes an emergency standalone switch for controlling call control functions and means for routing a call from a first subscriber line to a second subscriber line through the emergency standalone switch. The emergency switching system may also include a conversion of time-division multiplexed digital signals and packetized digital signals. The emergency switching system provides emergency or local call service to a localized area serviced by the digital switch.

DESCRIPTION OF THE INVENTION

Figure 1:
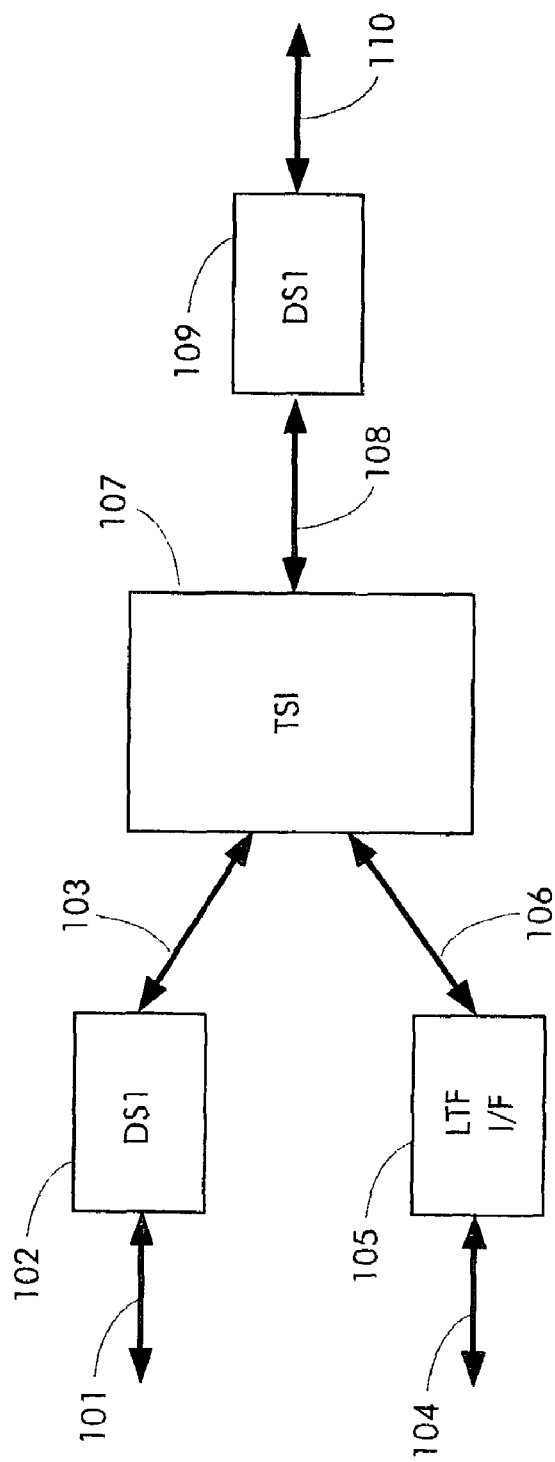
FIG. 1 illustrates an exemplary embodiment of a switching system interface that couples the line/trunk frames of a legacy class 5 digital switch and DS1s serving DLCs to a host switch using a DLC protocol.

A system and method of providing a conversion between time-division multiplexed digital signals and packetized digital signals with a switching system interface utilized to bypass a common control and switch matrix of a digital switch is disclosed. FIG. 1 illustrates an exemplary embodiment of a switching system interface that couples the line/trunk frames of a legacy class 5 digital switch and DS1s serving DLCs to a host switch using a DLC protocol. One or more line/trunk interfaces 105 couple to legacy line/trunk frames via one or more connections 104. One or more DS1 interfaces 102 connect to one or more transmission facilities 101 that operate remote DLC equipment. In addition, one or more DS1 interfaces 109 connect to one or more transmission facilities 110 that connect, in turn, to a host digital switch or a media gateway. A time-slot interchange function 107 connects to the line trunk interfaces 105 and DS1 interfaces 102 and 109 via internal Pulse Code Modulation (PCM) buses 108, 103, and 106, in order to make connections between timeslots in the interfaces. Calls are thus routed through the switching system interface.

Figure 2:
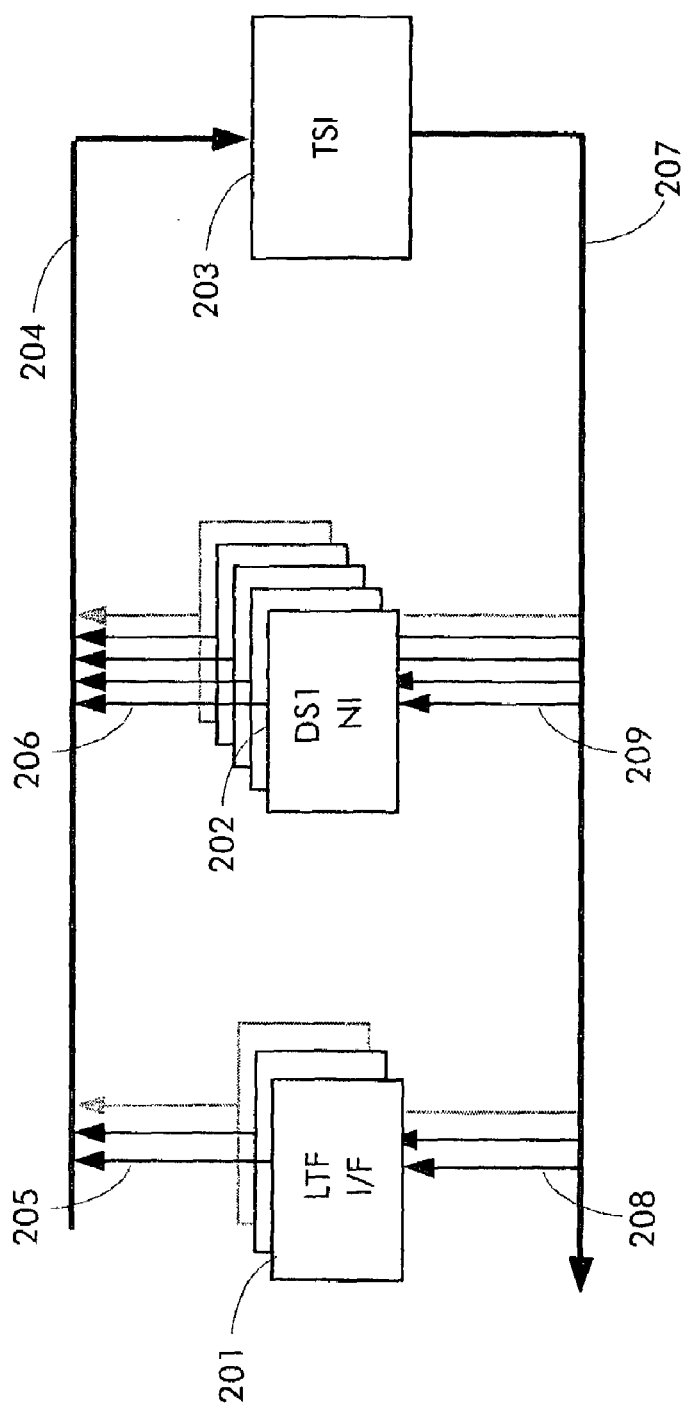
FIG. 2 illustrates an exemplary embodiment of the internal PCM data paths of the switching system interface of FIG. 1.

FIG. 2 illustrates an exemplary embodiment of the internal PCM data paths of the switching system interface of FIG. 1. One or more line/trunk frame interfaces 201 received PCM timeslots originating from the legacy line/trunk frames. These PCM timeslots are transmitted over preset timeslots on PCM busses 204. In a similar manner, PCM timeslots originating from transmission facilities connected to DLCs or to the host switch are received by DS1 interfaces 202 and transmitted over present timeslots on PCM bus 204.

The timeslot interchange function 203 receives time-division multiplexed PCM data from one or more PCM busses 204. The time interchange function 203 rearranges the data into new timeslots as necessary and transmits the PCM data onto one or more PCM busses 207. The line/trunk interfaces 201 then receive the PCM data from preset timeslots on PCM buses 207 and transmits the PCM data to the legacy line/trunk frames. In addition, DS1 interfaces 202 receive PCM data from preset timeslots on PCM buses 207 and transmit the PCM data to DLCs and the host switch through external transmission facilities.

Figure 3:
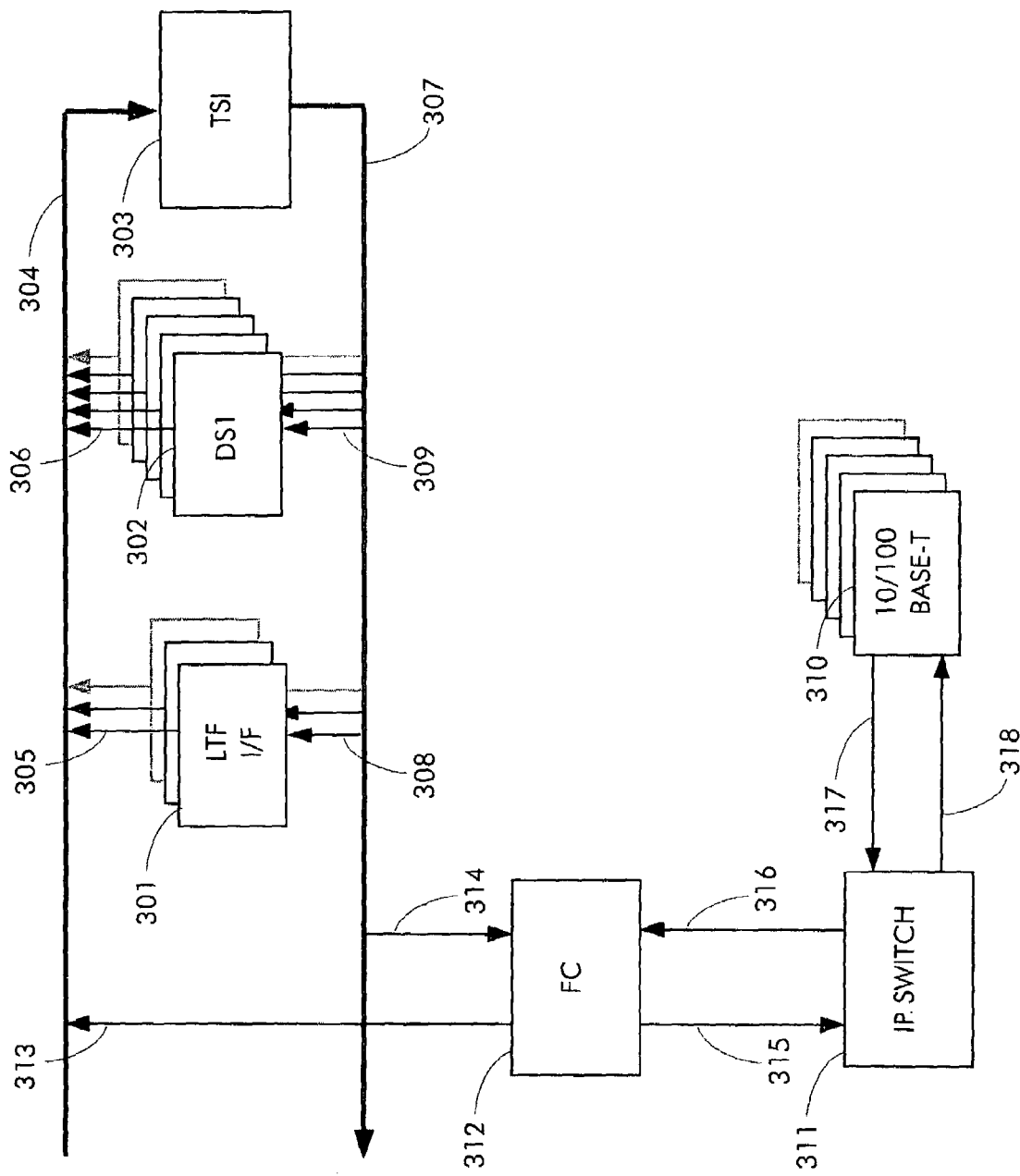
FIG. 3 illustrates a switching system interface having additional functions of connecting to IP-based networks and converting between time-division multiplexed and packet-based digital signals in the preferred embodiment of the present invention.

FIG. 3 illustrates a switching system interface having additional functions of connecting to IP-based networks and converting between time-division multiplexed and packet-based digital signals in the preferred embodiment of the present invention. The original switching system interface includes line trunk interfaces 301, DS1s 302, a timeslot interchange function 303, a PCM bus 304, and a PCM bus 307. In addition, the present invention also includes an IP section which includes an interface card 310, an IP switch 311, a packet transport 317 and a second packet transport 318. Additionally, in the preferred embodiment, the present invention includes a format converter (FC) 312, a packet transport 315 and a packet transport 316. The FC may convert the time division multiplexed digital voice signals to a packetized format and also may optionally compress the voice format (preferably utilizing a voice compression algorithm such as G.729). The FC may be a digital signal processor (DSP).

Referring to FIG. 3, the format converter 312 receives time-division multiplexed PCM data from preset timeslots on the PCM bus 307. The FC transmits time-division multiplexed PCM data to preset timeslots on PCM bus 304. The FC 312 also may have IP addresses for receiving packets from the IP switch 311 over the packet transport 316 and for transmitting packets back to the IP switch 311 over the packet transport 315. The packet transports may be implemented as 100baseT, which may include separate transmit and receive connections for each device on the network.

One or more network interface cards 310 may allow IP addresses external to the switching system interface depicted in FIG. 3 to the IP switch 311 over the packet transport 317 and to receive packets over the packet transport 318.

To establish a call from a conventional subscriber telephone to the IP network, analog signals from the telephone are converted into PCM data by hardware in the line frames of the switch and, in turn, interface with the line/trunk interfaces 301. The PCM data is then transmitted on a timeslot on the PCM bus 305 to the timeslot interchange 303. The timeslot interchange 303 transmits the PCM data onto a timeslot on the PCM bus 307 that is preset for the format converter 312. The FC then converts the PCM data to a packet format and transmits the PCM data to an external IP address over the packet transport 318 and the network interface card 310. The interface card 310 may then connect to an external IP network or any other network. Packets from the external IP address are sent to an address in the format converter 312 via the internal network 310, the packet transport 317, the IP switch 311, and the packet transport 316. Packets are then converted by the format converter 312 into time-division multiplexed PCM data and transmitted on a preset timeslot on the PCM bus 313 to the timeslot interchange 303, which, in turn, transmits the PCM data onto a timeslot on the PCM bus 307 that is preset for the conventional telephone connected to the line/trunk frame 301.

The network interface cards 310 and the IP switch 311 may also route packets between two external IP addresses, which could correspond to two local IP telephones or to a local IP telephone and a distant one served by the network. The switching system interface depicted in FIG. 3 may utilize the FC to convert the proprietary representation of legacy line states, such as "on-hook" and "off-hook" into messages that are sent to an external controlling device. In addition, messages may be received and interpreted from an external controlling device to apply legacy line supervision, such as ring voltage. Thus, the external controlling device may utilize the legacy telephone lines for making and receiving-phone calls over a packet network. The device may provide a capability for making and receiving telephonic calls over a packet network where calls are set up, routed, and torn down over a local area network (LAN) or the Internet. Additionally, the device may include the capability to register an identity, an address, or other characteristic of the network-based device with the switching system interface. The external controlling device may be used in the PSTN call model to control and route calls and maintain billing information or any other information associated with a subscriber. Additionally, the present invention may include generation of call progress tones, such as "dial tone," "busy," etc. to be applied to legacy lines under the control from messages originated from an external controlling device. The interface may include the capability for collecting DTMF tones or dial pulses from the legacy lines, interpreting these tones or pulses as digits, and sending the digital information as messages to the external controlling device. The external controlling device may be a pure softswitch that controls calls without directed access to the PCM data.

Figure 4:
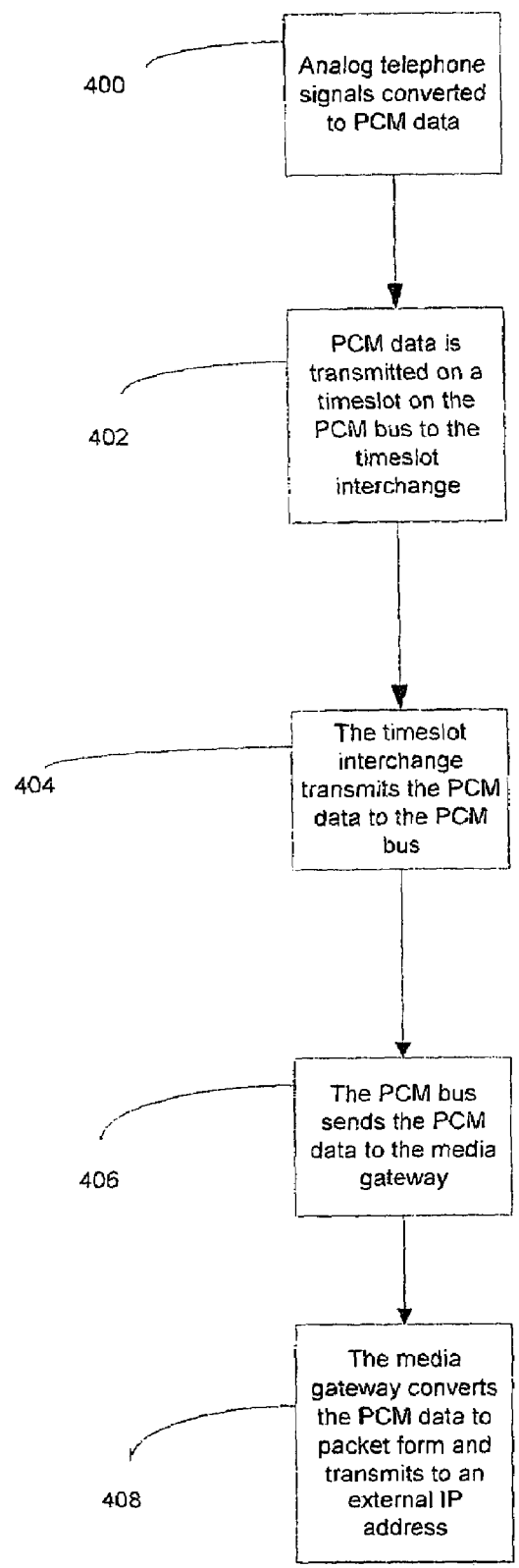
FIG. 4 is a flow chart outlining the steps for converting time-divisions multiplexed digital signals to packetized digital signals with a switching system interface used to bypass the common control and switch matrix of a legacy class 5 digital switch according to the teachings of the present invention.

FIG. 4 is a flow chart outlining the steps for converting time-division multiplexed digital signals to packetized digital signals with a switching system interface used to bypass the common control and switch matrix of a legacy class 5 digital switch according to the teachings of the present invention. With reference to FIGS. 3 and 4, the steps of the method will now be explained. In step 400, analog signals from a telephone are converted into PCM data by line frames of the switch which interface with the line/trunk interfaces 301. In step 402, the PCM data is transmitted on a timeslot on the PCM bus 305 to the timeslot interchange 303. Next, in step 404, the timeslot interchange 303 transmits the PCM data onto a timeslot on the PCM bus 307, which is preset for the format converter 312. In step 406, the PCM bus 307 sends the PCM data to the format converter 312. The method then moves to step 408 where the format converter 312 converts the PCM data to packet form and transmits the data to an external IP address over the packet transport 318 and the network interface card 310.

Figure 5:
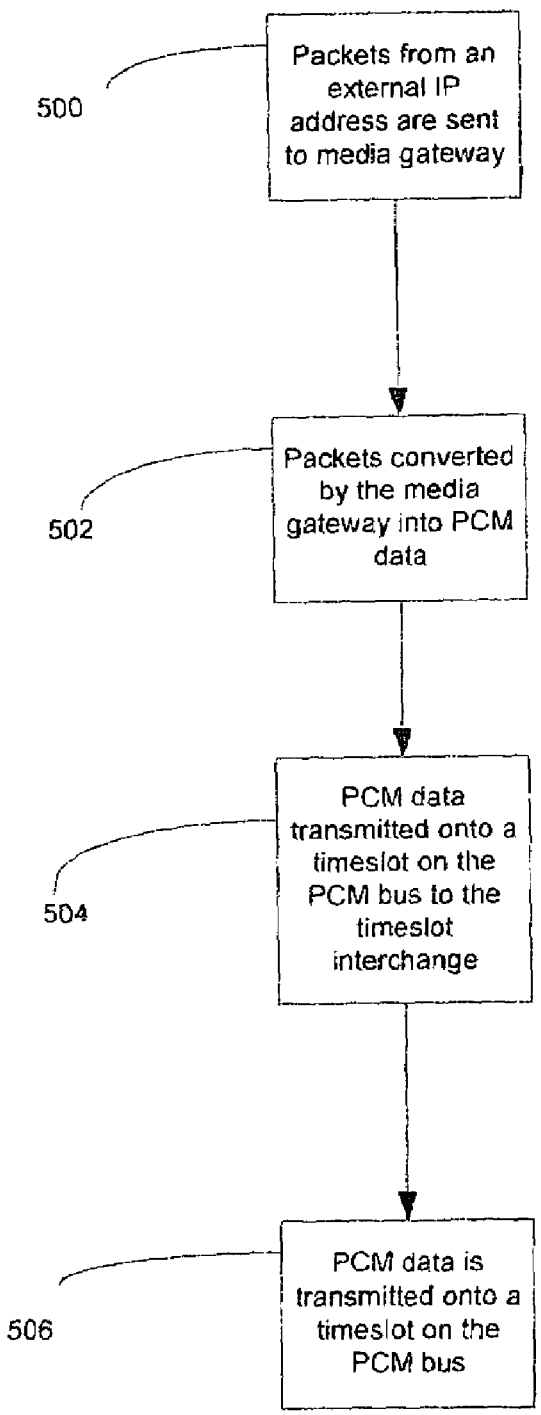
FIG. 5 is a flow chart outlining the steps for converting packetized digital signals to time-division multiplexed digital signals with a switching system interface used to bypass the common control and switch matrix of a legacy class 5 digital switch according to the teachings of the present invention.

FIG. 5 is a flow chart outlining the steps for converting packetized digital signals to time-division multiplexed digital signals with a switching system interface used to bypass the common control and switch matrix of a legacy class 5 digital switch according to the teachings of the present invention. With reference to FIGS. 3 and 5, the steps of the method will now be explained. The method begins with step 500 where the packets from the external IP address are sent to an address in the format converter 312 via the network interface card 310, the packet transport 317, the IP switch 311, and the packet transport 316. Next, in step 502, the packets are then converted by the format converter 312 into time-division multiplexed PCM data. In step 504, the time-division multiplexed PCM data is transmitted onto a preset timeslot on the PCM bus 313 to the timeslot interchange 303. In step 506, the PCM data is then transmitted onto a timeslot on the PCM bus 307 that is preset for the conventional telephone connected to the line/trunk frame 301.

Figure 6:
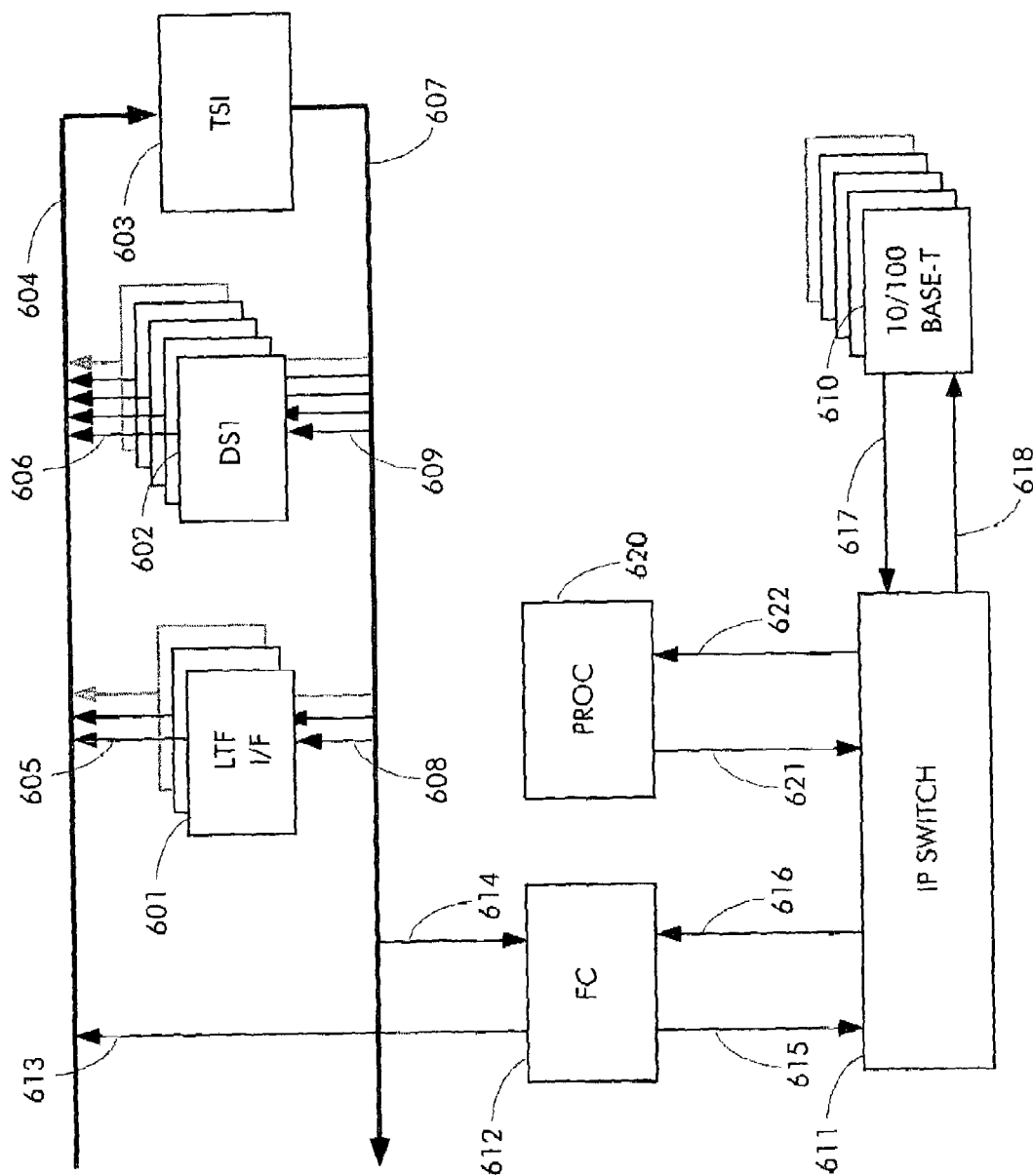
FIG. 6 illustrates a switching system interface providing a registry and proxy server to enable IP-based call control in an alternate embodiment of the present invention.

FIG. 6 illustrates a switching system interface providing a registry and proxy server to enable IP-based call control in an alternate embodiment of the present invention. The switching system interface includes line trunk interfaces 601, DS1s 602, a timeslot interchange function 603, a PCM bus 604, and a PCM bus 607. In addition, the present invention also includes an IP section which includes an interface card 610, an IP switch 611, a packet transport 617 and a second packet transport 618. Additionally, in this alternate embodiment, the present invention includes a format converter (FC) 612, a packet transport 615 and a packet transport 616. In a similar manner as described in FIG. 3, the FC may convert the time division multiplexed digital voice signals to a packetized format and also may optionally compress the voice format (preferably utilizing a voice compression algorithm such as G.729). In addition, in this alternate embodiment, the present invention may include a processor 620, a packet transport 621 and a packet transport 622 communicating with the IP switch 611.

Still referring to FIG. 6, the format converter 612 receives time-division multiplexed PCM data from preset timeslots on the PCM bus 607. The FC transmits time-division multiplexed PCM data to preset timeslots on the PCM bus 604. The FC 612 also may have IP addresses for receiving packets from the IP switch 611 over the packet transport 616 and for transmitting packets back to the IP switch 611 over the packet transport 615. The packet transports may be implemented as 100baseT, which may include separate transmit and receive connections for each device on the network.

One or more network interface cards 610 may allow IP addresses external to the switching system interface depicted in FIG. 6 to the IP switch 611 over the packet transport 617 and to receive packets over the packet transport 618.

To establish a call from a conventional subscriber telephone to the IP network, analog signals from the telephone are converted into PCM data by hardware in the line frames of the switch and, in turn, interface with the line/trunk interfaces 601. The PCM data is then transmitted on a timeslot on the PCM bus 605 to the timeslot interchange 603. The timeslot interchange 603 transmits the PCM data onto a timeslot on the PCM bus 607 that is preset for the format converter 612. The FC then converts the PCM data to a packet format and transmits the PCM data to an external IP address over the packet transport 618 and the network interface card 610. The interface card 610 may then connect to an external IP network or any other network. Packets from the external IP address are sent to an address in the format converter 612 via the internal network 610, the packet transport 617, the IP switch 611, and the packet transport 616. Packets are then converted by the format converter 612 into time-division multiplexed PCM data and transmitted on a preset timeslot on the PCM bus 613 to the timeslot interchange 603, which, in turn, transmits the PCM data onto a timeslot on the PCM bus 607 that is preset for the conventional telephone connected to the line/trunk frame 601.

The network interface cards 610 and the IP switch 611 may also route packets between two external IP addresses, which could correspond to two local IP telephones or to a local IP telephone and a distant one served by the network. Thus, the present invention shown in FIG. 6 enables calls to be set up, routed and torn down over a LAN or the Internet without the need for an external controlling device, such as a softswitch or a proxy server. Additionally, the present invention may further include the processor 620 to register conventional subscriber phones that are connected to the legacy line frames and proxy server. The processor 620 provides control of call states for these phones. In the embodiment depicted in FIG. 6, the present invention serves as a network end-point for an IP-based call control method, such as Session Initiation Protocol, thereby eliminating the need for a softswitch. The registration may include the network-based device identity, network address and other characteristics with the switching system interface. The processor may also enable one or more network-based proxy servers to register their identities, network addresses, and other characteristics of each legacy line or phone device associated with the switching system interface, thereby creating a public network.

The present invention may also be used to convert time-division multiplexed digital signals and packetized digital signals in a network utilizing an emergency standalone switching device. The emergency standalone switching device may be used to route calls between subscribers in a serving area without the use of external switching equipment and regardless of whether the subscribers are served by time-division multiplexed equipment or by any form of pack-based equipment or access network.

The present invention provides the combination of a conversion function between time-division multiplexed digital signals and packetized digital signals with as switching system interface used to bypass the common control and switch matrix of a legacy class 5 digital switch, so that the combination can be used to route calls between time-division multiplexed equipment, such as legacy line/trunk frames and DLCs and a packet network. The present invention provides the interoperability between different types of digital signals in an economical fashion.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A switching system converter providing conversion between time-division multiplexed digital signals and packetized digital signals used to bypass a common control and switch matrix of a class 5 digital switch, the switching system converter comprising:
    a switching system interface having means for bypassing a common control and switch matrix of a class 5 digital switch, the switching system interface having:
        at least one network interface for terminating a digital transmission facility that is part of a network architecture;
        at least one line/trunk interface, compatible with internal signals used to operate the line/trunk interface of the class 5 digital switching system; and
        a switching means, connected to the network interface and to the line/trunk interface, for routing data between the network interfaces and the line/trunk interface; and
    means for converting data between time-division multiplexed digital signals of a legacy line frame of a legacy line and packetized digital signals utilizing pulse code modulation (PCM) data transport.

2. The switching system converter of claim 1 wherein the packetized PCM data transport is Internet Protocol (IP).

3. The switching system converter of claim 1 further comprising:
    means for converting a proprietary representation of a legacy line state of the legacy line into a message sent to an external controlling device; and
    means for receiving and interpreting the message from the external controlling device to apply legacy line supervision;
    whereby the external controlling device provides a capability for making and receiving telephonic calls over a packet network.

4. The switching system converter of claim 3 further comprising:
    means for generating call progress aural tones applied to the legacy line under the control of a message from the external controlling device;
    means for collecting DTMF tones or dial pulses from the legacy line;
    means for interpreting the tones or pulses as digits; and
    means for sending the digital information as a message to the external controlling device;
    whereby the external controlling device controls calls without direct access to the PCM data.

5. The switching system converter of claim 1 further comprising:
    means for converting a proprietary representation of a legacy line state of the legacy line into a message sent to a packet network-based device; and
    means for receiving and interpreting the message from the packet network-based device to apply legacy line supervision, the packet network-based device providing a capability for making and receiving telephonic calls over a packet network whereby calls are set up, routed, and torn down over a local area network (LAN) or the Internet.

6. The switching system converter of claim 5 further comprising a registry means allowing a network-based device to register an identity, an address or other characteristic of the network-based device with the switching system interface.

7. A switching system interface providing conversion between time-division multiplexed digital signals and packetized digital signals used to bypass a common control and switch matrix of a class 5 digital switch, the switching system interface comprising:
    a switching system interface having means for bypassing a common control and switch matrix of a class 5 digital switch:
        at least one network interface for terminating a digital transmission facility that is part of a packet-network architecture;
        at least one line/trunk interface, compatible with internal signals used to operate a line/trunk frame of the class 5 digital switching system;
        a switching means, connected to the network interface and to the line/trunk interface, for routing data between the network interfaces and the line/trunk interface; and
        means for converting data between time-division multiplexed digital signals and packetized digital signals.

8. The switching system interface of claim 7 wherein the means for converting data between time-division multiplexed digital signals and packetized digital signals includes utilizing a digital signal processor.

9. The switching system interface of claim 7 further comprising:
    one or more digital signal processing means, connected to the switching means, for capturing telephone numbers dialed by subscribers connected to the line/trunk interface;
    a memory for storing a list of telephone numbers;
    a means for comparing the captured telephone numbers against the stored list of telephone numbers;
    one or more data-oriented network interfaces connected to the switching means;
    whereby the switching system interface will identify dial-up internet calls placed by the subscribers to known internet service providers and divert the dial-up internet calls to the data-oriented network interfaces and prevent the dial-up internet calls from reaching the terminal of the network architecture and the terminal is relieved of the dial-up internet calls.

10. A method of combining time-division multiplexed digital signals and packetized digital signals with a switching system interface used to bypass the common control and switch matrix of a legacy class 5 digital switch, the method comprising the steps of:
    utilizing a switching system interface to bypass a common control and switch matrix of the digital class 5 switch;
    accessing internal signals of the class 5 digital switching system used to control line and trunk interfaces of the class 5 digital switching system and convey data in and out of the line and trunk interfaces;
    providing a switching system interface comprising at least one network interface connected to at least one digital transmission facility that is part of a network architecture, and comprising interfaces compatible with the internal signals; and connecting the compatible interfaces of the switching system interface to the internal signals of the class 5 digital switching system, the connection between the compatible interfaces and the internal signals enabling a terminal in the network architecture to directly operate the internal signals to provide telecommunications service to subscribers connected to the line and trunk interfaces without the use of the common-control-and switch matrix of the class 5 digital switching system; and converting time-division multiplexed digital signals to packetized digital signals through the switching system interface.

11. The method of combining time-division multiplexed digital signals and packetized digital signals of claim 10 further comprising the steps of:
identifying dial-up internet calls dialed by subscribers connected to the line and trunk interfaces; and
diverting identified dial-up internet calls to a facility for handling internet traffic separate from the terminal.

12. The method of combining time-division multiplexed digital signals and packetized digital signals of claim 11 wherein the step of identifying dial-up internet calls includes:
providing a means within the switching system interface for capturing telephone numbers dialed by subscribers connected to the line and trunk interfaces;
providing a memory for storing within the switching system interface a list of telephone numbers of known internet service providers; and
providing a means within the switching system interface for comparing the telephone numbers dialed by the subscribers against the list in order to identify dial-up internet calls.

13. The method of combining time-division multiplexed digital signals and packetized digital signals of claim 10 further comprising the steps of connecting a digital signal processor within the telecommunications network to the second connection to enable the media gateway to communicate with the internal signals.

14. The method of combining time-division multiplexed digital signals and packetized digital signals of claim 10 wherein the step of converting time-division multiplex digital signals to packetized digital signals includes:
receiving signals originating form a line trunk frame;
extracting Pulse Code Modulation (PCM) data and signal information from these signals;
transmitting the PCM data on a timeslot;
packetizing the PCM data; and
transmitting the packetized data to an external IP address.

15. An emergency switching system with a switching system interface providing conversion between time-division multiplexed digital signals and packetized digital signals used to bypass a common control and switch matrix of a class 5 digital switch, the emergency switching system comprising:
a switching system interface used to bypass a common control and switch matrix of a digital switch;
an emergency standalone switch for controlling call control functions, the emergency standalone switch computed to the switching system interface; and
means for routing a call from a first subscriber line to a second subscriber line through the emergency standalone switch;
means for converting time-division multiplexed digital signals and packetized digital signals;
whereby the emergency switching system provides emergency or local call service to a localized area previously serviced by the digital switch.

16. The emergency switching system of claim 15 further comprising a database storing a plurality of directory numbers of subscribers located within the localized area, the database providing directory numbers for call control by the emergency standalone switch for providing local or emergency call service to a subscriber serviced by the class 5 digital switch.

* * * * *